(12) United States Patent
Rutter et al.

(10) Patent No.: US 12,218,533 B1
(45) Date of Patent: Feb. 4, 2025

(54) MULTI-BUS ENERGY STORAGE SYSTEM

(71) Applicant: eIQ Energy, Inc., Santa Clara, CA (US)

(72) Inventors: Robert E. Rutter, San Jose, CA (US); William B. Reed, San Jose, CA (US); Eugene F. Krzywinski, San Jose, CA (US)

(73) Assignee: eIQ Energy, Inc., Santa Clara, CA (US)

( * ) Notice: Subject to any disclaimer, the term of this patent is extended or adjusted under 35 U.S.C. 154(b) by 28 days.

(21) Appl. No.: 18/221,290

(22) Filed: Jul. 12, 2023

(51) Int. Cl.
| | |
|---|---|
| *H02J 1/12* | (2006.01) |
| *H02J 3/38* | (2006.01) |
| *H02J 3/46* | (2006.01) |
| *H02J 7/00* | (2006.01) |
| *H02J 7/34* | (2006.01) |
| *H02J 7/35* | (2006.01) |

(52) U.S. Cl.
CPC .............. *H02J 7/0013* (2013.01); *H02J 1/12* (2013.01); *H02J 3/38* (2013.01); *H02J 3/381* (2013.01); *H02J 3/46* (2013.01); *H02J 7/0048* (2020.01); *H02J 7/005* (2020.01); *H02J 7/342* (2020.01); *H02J 7/35* (2013.01); *H02J 2207/20* (2020.01); *H02J 2300/24* (2020.01)

(58) Field of Classification Search
CPC ........ H02J 1/10; H02J 1/12; H02J 3/38; H02J 3/381; H02J 3/46; H02J 7/0013; H02J 7/0014; H02J 7/0047; H02J 7/0048; H02J 7/0049; H02J 7/005; H02J 7/007182; H02J 7/34; H02J 7/342; H02J 7/35; H02J 2207/20; H02J 2300/24
See application file for complete search history.

(56) References Cited

U.S. PATENT DOCUMENTS

| | | | | |
|---|---|---|---|---|
| 2018/0244407 | A1* | 8/2018 | Rozman | H02J 1/08 |
| 2019/0039707 | A1* | 2/2019 | Ezaki | B63J 99/00 |
| 2020/0153351 | A1* | 5/2020 | Jiao | H02J 7/0018 |
| 2020/0259330 | A1* | 8/2020 | Dong | H02J 7/0018 |
| 2022/0200314 | A1* | 6/2022 | Zhou | H02J 7/00712 |
| 2023/0246446 | A1* | 8/2023 | Raghuchandra | H02J 3/32 307/52 |

* cited by examiner

*Primary Examiner* — Levi Gannon
(74) *Attorney, Agent, or Firm* — Michael B. Einschlag

(57) ABSTRACT

A multi-bus, energy storage system includes an energy storage bus that provides energy storage; a power demand bus that provides power delivery; and a supervisory system comprised of a system supervisor.

17 Claims, 5 Drawing Sheets

Prior Art

3000

Prior Art

4000

MULTI-BUS ENERGY STORAGE SYSTEM

TECHNICAL FIELD

One or more embodiments relate to multi-bus energy storage, and more particularly, to multi-bus energy storage battery systems.

BACKGROUND

Most solar power systems for typical households and commercial buildings are connected to the AC power grid using what is known as "net metering." Net metering is a rate plan in which a ratepayer's electric meter will spin in reverse when excess solar power is supplied back onto the utility company grid. This provides financial incentives for use of solar power by reducing the ratepayer's electric power bill, and in some cases, provides income to the ratepayer.

In recent times, the ever-increasing amount of excess solar power exported by households and commercial buildings during mid-day at peak solar power is beginning to exceed the ability of the electric utility grid to absorb the energy. This has the potential for causing instability of the electric utility grid to which these solar power systems are exporting. To alleviate this potential for causing instability, utility companies are exploring rules, such as financial disincentives, for net metering-connected solar power systems. For example, one utility has changed the net metering plan such that a ratepayer is "charged" for feeding solar power onto the grid during the mid-day solar peak, and the ratepayer only "receives" payback credit for energy exports during early evening, well after peak solar production. Another utility has disseminated the following message "Recently, the California Public Utilities Commission (CPUC) approved a decision to reduce the rates California utilities pay rooftop solar customers for excess power they sell back to the grid . . . [for systems installed] after Apr. 14, 2023."

Other ratepayers are concerned about utility blackouts, which are becoming more frequent in rural areas as the electric grid continues to age. Still others desire to avoid what is called "time-of-use" (TOU) charges, where a utility charges substantially more for electricity usage during peak demand times.

The above-described issues are creating a market for battery storage systems which can help alleviate net metering disincentives as well as reduce TOU charges. Some battery storage systems provide power for critical appliances during power blackouts. These battery systems come in a wide array of sizes. Some have a fairly small energy storage capacity, i.e., only enough storage capacity to allow the ratepayer to shift the daily solar energy harvest or to offset TOU charges to financially beneficial time periods. Other battery storage systems have a moderate-sized battery system which is sufficient to power critical loads during a power blackout.

However, a growing number of ratepayers are looking for larger battery systems which are sufficient to run their entire home or business for extended periods during a blackout as well as to shift purchasing of AC grid power to provide lower TOU cost. At present, battery systems for providing this "whole home" solution are lacking.

A major reason these larger battery systems are lacking has to do with what are termed "parasitic energy losses." Parasitic energy losses represent energy consumed by the battery storage system itself. As an example, a modest size, high-energy efficient residence will consume about 12 kWH of energy per 24 hour period and will require short peaks of power up to about 24 KW. A single battery that can supply both the kWH energy storage as well as the kW power demand will typically weigh more than 2000 pounds. This makes shipping and installation a challenge for a residence. For this reason, most home systems use multiple small batteries, usually in the 48V DC range, as they are easy to handle, widely available, and therefore offer the lowest cost per watt.

Since standard utility power is 240V AC/120V AC, the 48V DC batteries need to power a DC AC inverter. There are two conventional single-bus systems in use to do this. A first such system entails stacking enough batteries in series, for example ten (10) 48V DC batteries, to yield 480V DC. This system allows a standard DC AC inverter to convert the 480V DC into 240V AC to power the home. A second such system entails configuring 48V DC batteries in parallel and using a boost converter to generate 480V DC.

Regardless of the system, parallel, serial, or a combination of both, any time multiple batteries are connected in a system, their state-of-charge must match. This prevents different batteries from being charged too much, or too little. Although there are strengths and weaknesses of each such arrangement, both of these systems have significant tradeoffs that make them financially unmarketable for a "whole home" energy storage system.

SUMMARY

As set forth above, regardless of how a battery storage system is arranged, any such arrangement must meet the energy usage of a typical home (for example, 12 kWH of energy per 24-hour period). It has been discovered that reducing parasitic energy losses of a battery storage system reduces the cost of the battery storage system (up to as much as proportionally) because less battery storage capacity is needed to provide the same kWH energy needs of the typical home. In other words, a battery storage system may be fabricated whose cost is nearly proportional to its kWH storage capacity.

One or more embodiments is a multi-bus, energy storage system that comprises an energy storage bus that provides energy storage; a power demand bus that provides power delivery; and a supervisory system comprised of a system supervisor.

One or more embodiments of the multi-bus, energy storage system potentially can eliminate up to 90% of the parasitic energy losses when compared with either of the above-described conventional, single bus systems (i.e., single bus systems using parallel-connected, battery storage or series-connected, battery storage). As such, one or more embodiments of the described multi-bus, energy storage system may result in substantial cost savings, while at the same time being easily tailored and expanded to meet household energy needs.

DETAILED DESCRIPTION

Figure 2:
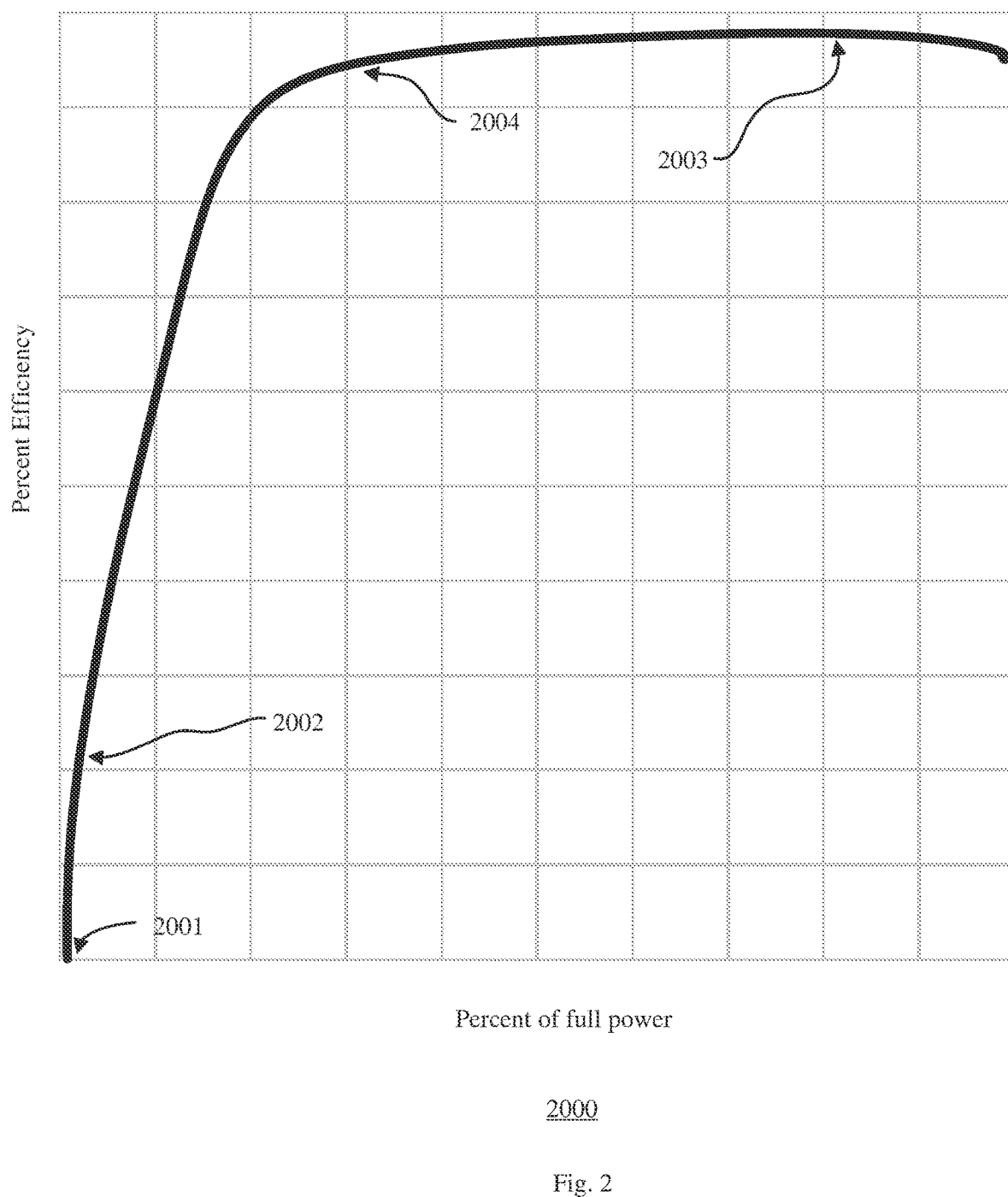
FIG. 2 shows a conversion efficiency curve that is representative of the conversion efficiency of typical, industry standard, state-of-the-art DC DC switch mode converters as well as DC DC chargers used in existing energy storage/inverter systems.

FIG. 2 shows a conversion efficiency curve that is representative of the conversion efficiency of typical, industry standard, state-of-the-art, DC DC switch mode converters used in existing energy-storage/inverter systems. There are two main factors controlling the efficiency curve. First, consider what occurs as a converter runs in a region between percentage-of-full-power-point 2001 and percentage-of-full-power-point 2002. In this region, the dominant factor is quiescent, or fixed, power loss any time the switch mode converter is in a "run" mode. This quiescent or fixed power loss is caused by power drawn by control electronics required to operate the switch mode converter. Typical quiescent losses are about 1% to 2% of peak rated power for state-of-the-art converters. As the converter power drops to low levels, the fixed quiescent loss sends the conversion efficiency to zero. In other words, sitting at idle or near idle power results in energy drained from a battery system to which the converter is connected. Second, consider what occurs as the converter runs in a region between percentage-of-full-power-point 2002 and percentage-of-full-power-point 2003. In this region, starting at percentage-of-full-power-point 2002 and moving past percentage-of-full-power-point 2004 towards percentage-of-full-power-point 2003, fixed losses become a smaller percentage of the converter power. For example, at percentage-of-full-power-point 2003, a state-of-the-art converter will have a peak efficiency of about 98%. Past percentage-of-full-power-point 2003, another loss, called "$I^2R$" loss, begins to reduce the efficiency again. Such high power $I^2R$ loss is due to high currents (I) flowing through resistive (R) elements that are inherent in any electrical circuit. The key point is that, to reduce parasitic energy losses, switch mode converters must either be completely off, to eliminate the quiescent loss, or run at peak efficiency point 2003. In other words, operating converters in a region between percentage-of-full-power-point 2001 and percentage-of-full-power-point 2004 ought to be avoided.

Figure 3:
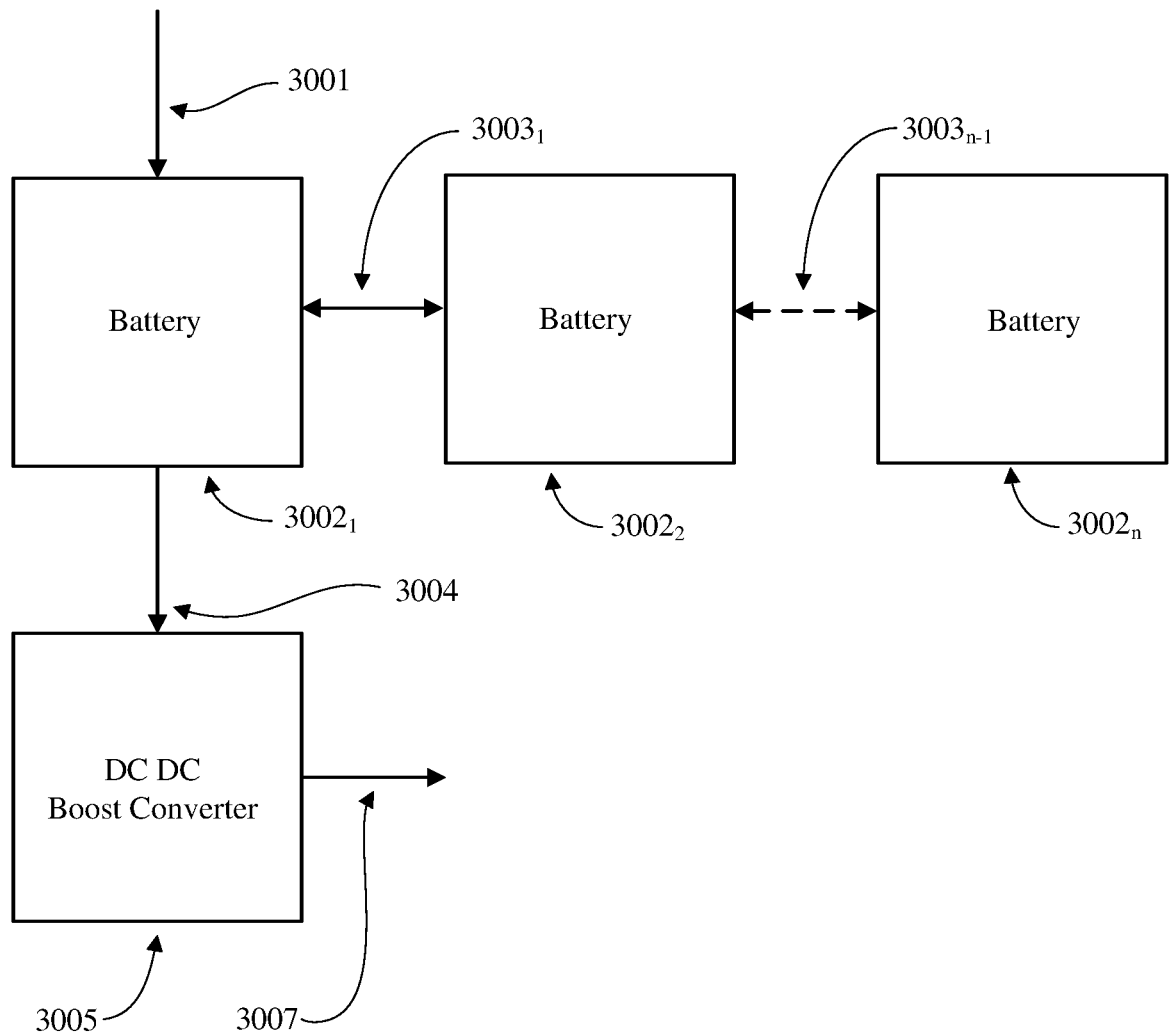
FIG. 3 shows a block diagram of a prior art, low voltage, parallel-connected, battery array and a DC DC boost converter.

FIG. 3 shows a block diagram of a prior art, low voltage, parallel-connected, battery array ("parallel battery array") and a DC DC boost converter. As shown in FIG. 3, multiple low voltage batteries $3002_1$-$3002_n$ of the parallel battery array are connected in parallel by lines $3003_1$-$3003_{n-1}$. The parallel battery array will have as many batteries as is required to store a desired amount of energy (energy may be expressed in units of kWH). As further shown in FIG. 3, line 3001 in FIG. 3, connects energy, input from any desired source(s) (not shown, such as, for example and without limitation, the AC utility grid, solar panels, generator(s), and so forth) to the parallel battery array. As further shown in FIG. 3, the parallel battery array is connected to DC DC boost converter 3005 by line 3004. As is known, DC DC boost converter 3005 is used to increase the voltage of the parallel battery array up to a voltage required by a DC AC inverter (not shown in FIG. 3). For example, where the batteries in the parallel battery array are 48V DC batteries, DC DC boost converter 3005 boosts the 48V DC to 480 V DC. Line 3007 connects the 480V DC output from DC DC boost converter 3005 to a DC AC inverter (not shown in FIG. 3). An advantage of such a parallel battery array is that, since all the battery terminals are parallel-connected to each other, the battery voltage is constant among all the batteries. When the battery voltage is the same for all the batteries, the state-of-charge will be, to first order, the same for all the batteries. This natural balancing reduces the need for complex battery charge balancing procedures. However, there is a disadvantage. Since power peaks, up to 24 kW for an average home (discussed above in the Background), can happen at any given time, DC DC boost converter 3005 must run continuously. This means that, for most of the time, DC DC boost converter 3005 is sitting in the low efficiency region (between percentage-of-full-power-points 2001 and 2002) shown on FIG. 2. For a DC DC boost converter with a 24 kW peak power output, the resulting 2% quiescent loss will be about 500 W. At peak power, and operating at a 98% peak efficiency, the DC DC boost converter energy loss is 0.02*24 KW or again 500 W. Thus, over a 24-hour period, these two losses amount to 24 Hours*500 W or 12 KWH. This means that a low voltage storage system will consume as much parasitic energy per day as is required in the average home (refer to the Background).

Figure 4:
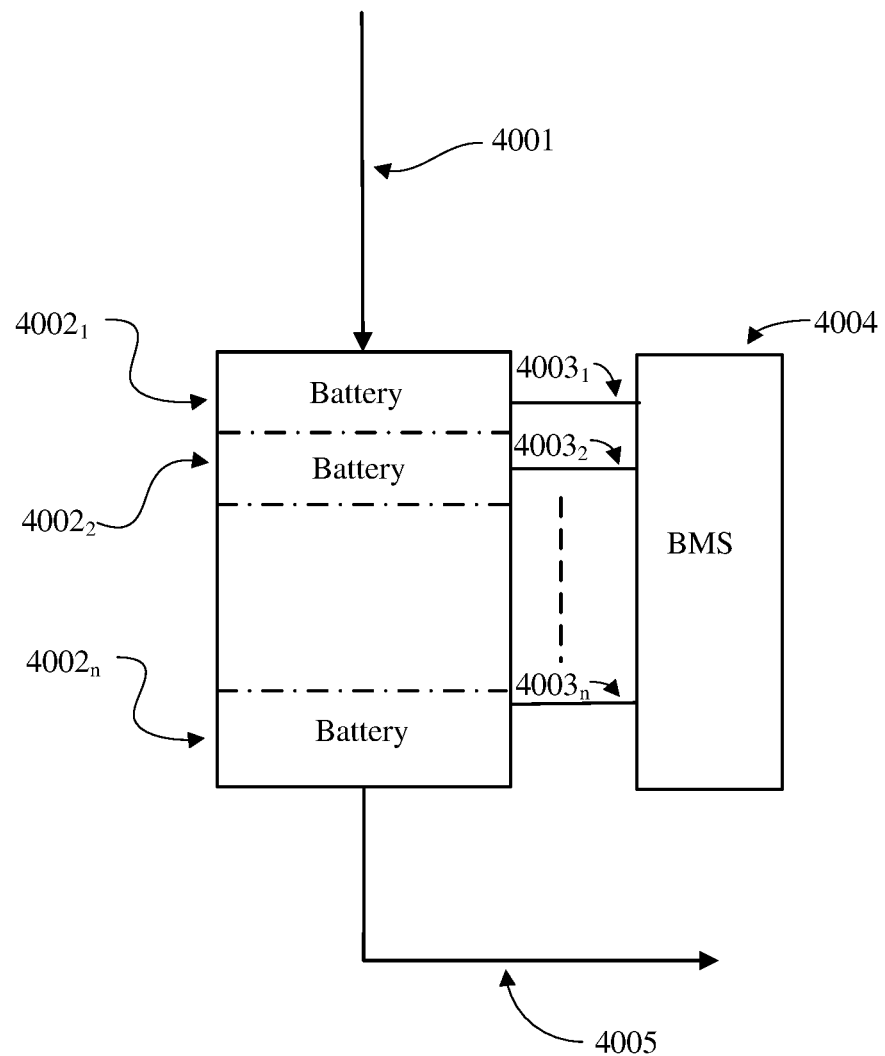
FIG. 4 shows a block diagram of a prior art, high voltage, series-connected, battery array with charge balancing circuits.

FIG. 4 shows a block diagram of a prior art, high voltage, series-connected, battery array ("series battery array") with charge balancing circuits. As shown in FIG. 4, multiple low voltage batteries $4002_1$-$4002_n$ are connected in series. Line 4001 in FIG. 4 connects energy, input from any desired source(s) (such as, for example and without limitation, the AC utility grid, solar panels, generator(s), and so forth), to the series battery array. As the series battery array can provide high enough voltage (for example, 480V DC discussed above) to run a DC AC inverter directly, there is no need for a DC boost converter. As such, line 4005 directly connects the series battery array to a desired DC AC inverter (not shown in FIG. 4). Parasitic losses in batteries, when at low power, are negligible. However, batteries $4002_1$-$4002_n$ do not have all the terminals connected in parallel. Thus, there is nothing inherent in the series connection arrangement that keeps all the batteries at the same voltage. As each battery will have slightly different charge and discharge tolerances, continual charging and discharging cycles results in an unequal voltage, and thus an unequal state-of-charge, between the batteries that worsens with every cycle. Without voltage correction, eventually some batteries will be overcharged, resulting in damage. In addition, other batteries may be depleted to a near zero state-of-charge and will fail. In order to alleviate the state-of-charge imbalance, a complex battery charge management system 4004 (BMS 4004) is needed. To keep the state-of-charge equal between the individual batteries in the series battery array, BMS 4004 will draw a small discharge current from batteries that are at a state-of-charge higher than the array's median state-of-charge. For example, if battery $4002_2$ is at a higher state-of-charge than the average of all the batteries, BMS 4004 will draw off some charge through line $4003_2$. A typical discharge BMS circuit might consume 50 W per battery. If half of the batteries in an example ten (10) battery stack are above median charge, then there will be a resulting parasitic energy loss of 50 W*5 batteries or 250 W. Over a 24-hour period, 250 W*24 Hours is 6 kWH, which is about half of the 12 kWH energy demand of the average home. While more energy efficient than the low voltage topology of FIG. 3, parasitic energy loss equaling one-half of the home's energy needs is far from ideal.

Figure 1:
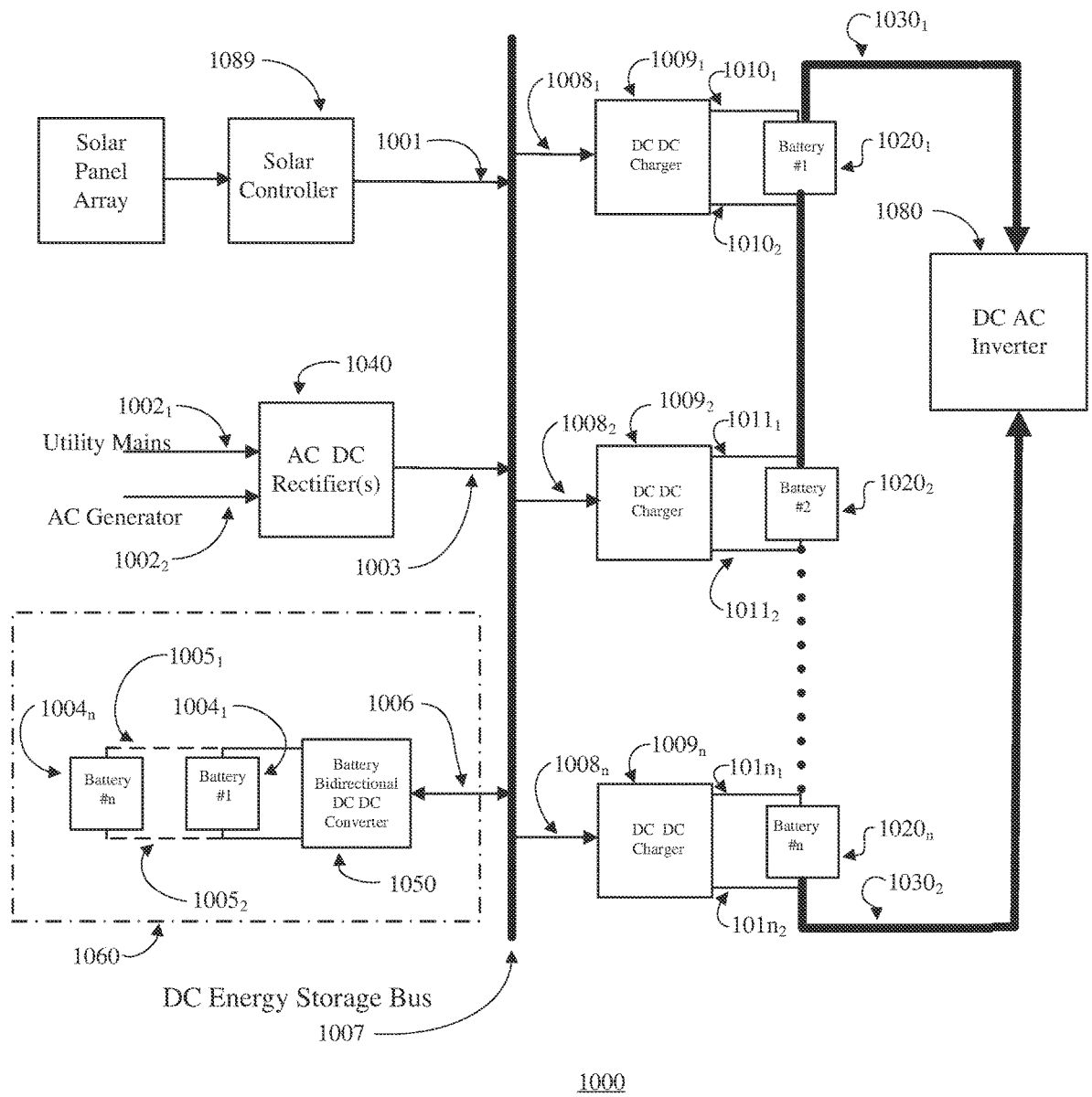
FIG. 1 shows a block diagram of an embodiment of a first portion (i.e., a two-bus structure) connected to a load, which first portion is used to fabricate an embodiment of a multi-bus, energy storage system having a two-bus structure.

FIG. 1 shows a block diagram of an embodiment of a first portion (i.e., two-bus structure 1000) connected to a load, which first portion is used to fabricate an embodiment of a multi-bus, energy storage system. The multi-bus, energy storage system is comprised of a combination of two-bus structure 1000 (shown in FIG. 1) and supervisory system 5000 (shown in FIG. 5), and as will be described below, the multi-bus, energy storage system exhibits low parasitic loss while combining the strengths of both the low voltage, parallel-connected, battery system and the high voltage, series-connected, battery system described above; while avoiding the weaknesses of each.

In accordance with one or more embodiments of two-bus structure 1000 shown in FIG. 1, DC energy storage bus 1007 is designed to provide energy storage and DC power demand bus ($1030_1$, $1030_2$) is designed to provide power delivery.

As shown in FIG. 1, to deliver peak power needs, for example and without limitation, 24 kW for an average home (see the Background), a series-connected array of low voltage batteries $1020_1$-$1020_n$ is arranged on DC power demand bus ($1030_1$, $1030_2$). Power demand bus ($1030_1$, $1030_2$) connects to DC AC inverter 1080 to provide a required AC voltage. Batteries $1020_1$-$1020_n$ are charged individually by DC DC chargers $1009_1$-$1009_n$, respectively, over lines ($1010_1$, $1010_2$) to ($101n_1$, $101n_2$), respectively. As further shown in FIG. 1. DC DC chargers $1009_1$-$1009_n$ draw energy from DC energy storage bus 1007 over lines $1008_1$-$1008_n$, respectively. The voltage of batteries $1020_1$-$1020_n$ can be any suitable voltage, including, for example and without limitation, 48V DC.

Figure 5:
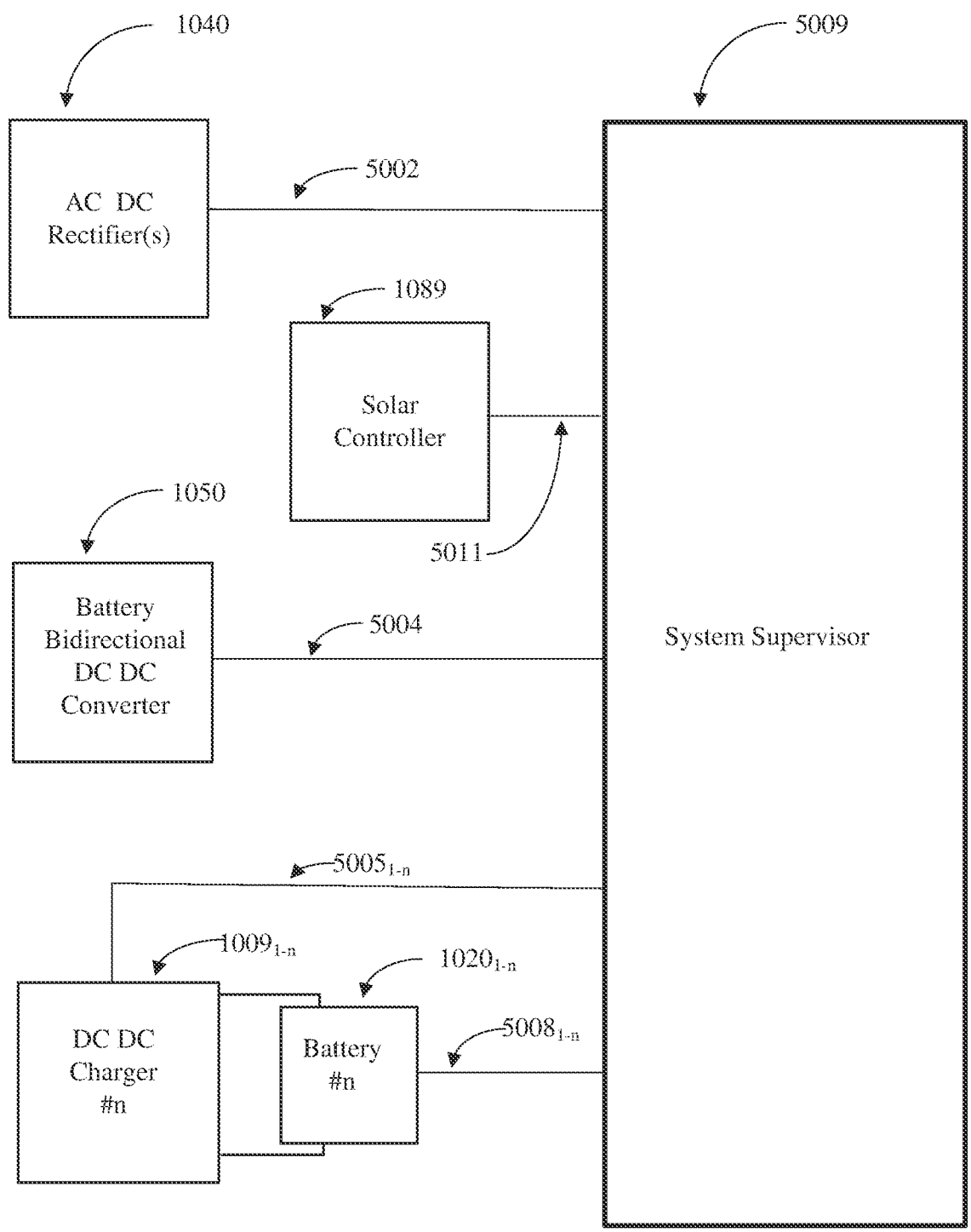
FIG. 5 shows a block diagram of an embodiment of a second portion (i.e., a supervisory system), which second portion is used to fabricate an embodiment of a multi-bus, energy storage system.

FIG. 5 shows a block diagram of an embodiment of a second portion (i.e., supervisory system 5000) used to fabricate a multi-bus, energy storage system. The multi-bus, energy storage system is comprised of a combination of two-bus structure 1000 (shown in FIG. 1) and supervisory system 5000 (shown in FIG. 5). As shown in FIG. 5, supervisory system 5000 includes system supervisor 5009. System supervisor 5009 may be any one of a number of system supervisors that are well known in the art, including microprocessor-based supervisors. Such system supervisors include, for example and without limitation, an Onlogic Factor 201 system and an Onlogic Karbon 801 system, both of which are available from OnLogic, Inc.

As shown in FIG. 5, system supervisor 5009 connects to AC DC rectifier(s) 1040 over control line 5002 (also referred to as a rectifier control line). In accordance with one or more embodiments, system supervisor 5009 receives information such as, for example and without limitation, the on/off state of, or the amount of output power from, AC DC rectifier(s) 1040 and sends supervisory level commands to AC DC rectifier(s) 1040 over control line 5002. For example and without limitation, system supervisor 5009 sends on/off commands or bus voltage settings to AC DC rectifier(s) 1040 over control line 5002. An example of such a supervisory level command is a command to turn on AC DC rectifier(s) 1040.

As further shown in FIG. 5, system supervisor 5009 connects to battery bidirectional DC DC converter 1050 over control line 5004 (also referred to as a storage control line). In accordance with one or more embodiments, system supervisor 5009 receives information from battery bidirectional DC DC converter 1050 and sends supervisory level commands to battery bidirectional DC DC converter 1050 over control line 5004. An example of such a supervisory level command is a command to battery bidirectional DC DC converter 1050 to use a lower charge power setting at a time when batteries $1004_1$-$1004_n$ (refer to FIG. 1) are near a full state of charge.

As further shown in FIG. 5, system supervisor 5009 connects to DC DC chargers $1009_{1-n}$ over control lines $5005_{1-n}$ (also referred to as charger control lines). In accordance with one or more embodiments, system supervisor 5009 receives information from DC DC chargers $1009_{1-n}$ and sends supervisory level commands to DC DC chargers $1009_{1-n}$ over control lines $5005_{1-n}$. For example and without limitation, system supervisor 5009 sends on/off commands or power settings to DC DC chargers $1009_{1-n}$. An example of such a supervisory level command would be a command to increase or decrease charge power as needed to keep batteries $1020_{1-n}$ at a similar state of charge. In accordance with one or more embodiments, batteries $1020_{1-n}$ may have optional BMS data links into their internal battery management systems (BMSs), and, in accordance with such embodiments, the optional BMS data links are connected to, and send BMS data to, system supervisor 5009 over lines $5008_{1-n}$. By monitoring the BMS data, system supervisor 5009 monitors the BMS data for each battery to determine, for example and without limitation, state of charge, state of health, and battery temperature. System supervisor 5009 would provide a warning notice to a user of the multi-bus, energy storage system (for example and without limitation, over a data link to an email server) regarding a battery with a poor state of health; a poor state of health means that the battery no longer has full storage capability.

As further shown in FIG. 5, system controller 5009 connects to solar controller 1089 over control line 5011 (also referred to as a solar control line). In accordance with one or more embodiments, system supervisor 5009 receives information from solar controller 1089 and sends supervisory level commands to solar controller 1089. An example of such a supervisory level command would be a command to direct solar controller 1089 to reduce solar power input to energy storage bus 1007 at times when batteries $1020_{1-n}$ are at full state of charge and there is less of a load on the system, meaning less power going out than coming in. Suitable solar controllers include the eIQ energy vBoost from eIQ energy, Inc. and the V600-32-20 from Ampt corp.

It is preferred that system supervisor 5009 not be involved in instantaneous control commands. A reason not to utilize an instantaneous central control arrangement is that balancing the voltage of energy storage bus 1007 would require rapid communication and precise coordination among supervisor 5009 and peripheral assets connected to energy storage bus 1007. Such coordination is complicated by a reality that each peripheral asset (i.e., AC DC rectifier(s) 1040, solar controller 1089, bidirectional DC DC converter 1050, and DC DC chargers $1009_{1-n}$), would reasonably be expected to have a different response time. Since controls for each asset would need to be custom tailored to the individual response times there is no additional benefit in placing all such custom control loops in one central supervisor. On the other hand, there might be a disadvantage for a central instantaneous control arrangement in that control commands must flow back and forth between system supervisor 5009 over each communication line 5002, 5011, 5000, and $5005_{1-n}$.

In accordance with one or more such embodiments, system supervisor 5009 monitors "long term" trends, such as, for example and without limitation, battery state of charge, or changes in available solar power over a full solar day. Other supervisory examples include issuing commands that would help reduce time-of-use (TOU) charges and issuing commands dealing with longer term trends such as upcoming cloudy days with less solar power available by causing energy storage batteries $1004_1$-$1004_n$ to be charged up more fully.

In accordance with one or more embodiments, as indicated in FIG. 1, each of batteries $1020_{1-n}$ has its own individual charger (for example, as indicated in FIG. 1, the individual charger for battery $1020_x$ is DC DC charger $1009_x$). In accordance with one or more further embodiments, a low state-of-charge battery (for example, battery $1020_x$) will be charged by its charger (for example, DC DC charger $1009_x$) at a high enough rate of current so that the charger (i.e., DC DC charger $1009_x$) is operating near, i.e., substantially at, its optimal operating point; as shown in FIG. 2 at point 2003. Conversely, a high state-of-charge battery (for example, battery $1020_y$) will be charged by its charger (for example, DC DC charger $1009_y$) at a low enough rate of current so that the charger (i.e., DC DC charger $1009_y$) is operating near point 2004 as shown in FIG. 2 (i.e., substantially at a predetermined non-optimal operating point), or not being operated at all, until necessary. In accordance with one or more embodiments, the state-of-charge of a battery can be determined, for example and without limitation, in accordance with one of the following techniques. In accordance with one technique, referring to FIG. 5, if the necessary equipment is available, state-of-charge data is received by system supervisor 5009 over lines $5008_{1-n}$ from battery management systems ("BMS") that are built into batteries $1020_{1-n}$, respectively. Such batteries are well known to those of ordinary skill in the art and are widely available commercially. In accordance with this technique, system supervisor 5009 issues commands to DC DC chargers $1009_{1-n}$ (using lines $5005_{1-n}$ shown in FIG. 5) specifying how much charge power to send to each battery. Then, in accordance with one or more embodiments of this technique, system supervisor 5009 causes the state-of-charge of each battery to be maintained at a predetermined level, for example and without limitation, eighty percent (80%), plus or minus a few percent, for example and without limitation, five percent (5%). Battery management systems often use multiple factors to determine a battery's state-of-charge. Two common methods include measuring the steady state voltage (i.e., no current flow) of the battery as well as how much energy has gone into or out of the battery. All batteries have some internal resistance; therefore when a battery is being heavily charged the voltage will be higher than the steady state voltage. To accommodate this, when the state-of-charge reported to system supervisor 5009 from the BMS of a particular battery is within, for example and without limitation, five percent (5%) of a predetermined target (for example and without limitation, eighty percent (80%)), system supervisor 5009 causes the DC DC charger associated with that battery to either turn off or else reduce its charging operation to, for example and without limitation, ten percent (10%) of the optimal operating point of the DC DC charger (where an optimal operating point is illustrated in FIG. 2 at point 2003). Lowering the charge current allows the BMS to make a more accurate assessment of the steady state battery voltage and, thus, the state-of-charge. During the low, or off, charge period, one method would be for system supervisor 5009 to monitor the reported state-of-charge. If, after several, for example and without limitation, five (5), minutes have elapsed and the state-of-charge is reporting values that do not change by more than, for example and without limitation, one percent (1%), then that value is assumed to be a stable and true assessment of the state-of-charge. Based upon that stable state-of-charge, system supervisor 5009 will take appropriate action. For example, if the state-of-charge is lower than the desired target, system supervisor 5009 will issue a command to the DC DC charger to resume charging until the desired target value is reached again. The cycles of charge and monitor will repeat, if necessary, until the state-of-charge is within target limits and then system supervisor 5009 would command the charger to turn off.

In accordance with another technique, battery manufacturers provide data sheets showing upper and lower steady state (meaning no battery current flow) voltage limits of the battery. In accordance with one or more embodiments of this technique, system supervisor 5009 operates to maintain the batteries at the same voltage, for example and without limitation, plus or minus one percent (1%), at the upper ninety-five percent (95%) of the voltage range between the lower and upper voltage limits (voltage is measured and reported by DC DC chargers $1009_{1-n}$ via control lines $5005_{1-n}$). As described above, all batteries have some internal resistance. Charging at a high current therefore results in a battery voltage higher than the steady state specified voltage. To reduce the voltage error of a battery that is very close to the full charge voltage of the battery, for example and without limitation, within two percent (2%), system supervisor 5009 sends a command to the DC DC charger to either turn off, or else reduce its charge rate to, for example and without limitation, be near point 2004 in FIG. 2. This allows a more accurate reading of the steady state battery voltage by DC DC chargers $1009_{1-n}$. DC DC chargers $1009_{1-n}$ report the battery voltage to system supervisor 5009 via control lines $5005_{1-n}$. If, after some time period, for example, several, for example and without limitation, five (5), minutes of battery voltage reports staying with one percent (1%) of each other, the voltage can be assumed to be a stable steady state voltage. At this time, system supervisor 5009 can decide either that the voltage is below the target window and command the DC DC charger to resume charging, or that the voltage is at or above the target window and command the DC DC charger to turn off. The charge and measure cycle repeats until the battery comes to the desired target voltage.

Advantageously, the individual charge arrangement shown in FIG. 1 eliminates the prior art need to drain energy from a battery to keep all the batteries at the same state of charge. In accordance with one or more such embodiments, instead of draining energy from a high state-of-charge battery, any individual battery charger (for example, any individual battery charger among DC DC chargers $1009_1$-$1009_n$, referring to FIG. 1) can either reduce or stop the charge current to its connected battery. At no time is energy drained for balancing, and as described below, this eliminates most of the 6 kWH parasitic energy loss described above for the prior art series-connected system. Further, advantageously, since DC DC chargers $1009_1$-$1009_n$ do not need to run continuously, the DC DC charge system can be optimized. For example, DC DC chargers that are not needed to run can be completely powered off, thereby eliminating fixed, quiescent parasitic energy losses. In addition, DC DC chargers that are charging will be set to run at an optimal power efficiency setting, also reducing parasitic losses. The optimal power setting for DC DC converters and chargers is listed in the particular unit's specifications, or may be determined by testing in accordance with one or more methods well known to those of ordinary skill in the art. An example of an optimal power point is illustrated on FIG. 2 at point 2003.

To keep battery array $1020_1$-$1020_n$ (referring to FIG. 1) fully charged (in order to supply a desired amount of energy, for example and without limitation, 12 kWH as discussed above for an average house), the charge power needs to be 12 kWH/24 hours or 500 W. At the same 98% efficiency, parasitic energy losses are 500 W*0.02 or 10 W. Over a 24 hour period this is 240 WH of parasitic energy loss, or 4% of the parasitic energy loss of the prior art, single bus, series-connected battery system discussed above.

In addition, since the series-connected array of batteries is at the native voltage needed for DC AC inverter 1080 (shown in FIG. 1) which is connected to lines $1030_1$ and $1030_2$ of DC power demand bus ($1030_1$, $1030_2$), there is no need for a boost converter. Therefore, there are no boost converter losses. A further advantage is that while DC power demand bus ($1030_1$, $1030_2$) must meet the 12 kWH daily demand of the average home, batteries in the power demand bus do not need to be sized to store 12 kWH. Since an optimal design would have the majority of the required daily energy storage (12 kWH in our example) be transferable from DC energy storage bus 1007, batteries $1020_1$-$1020_n$ can be relatively smaller in terms of kWH storage. Lower kWH-sized batteries are both proportionally lighter as well as less expensive. As such, batteries $1020_1$-$1020_n$ could be reduced to 2 kWH of storage, for example, and yet the system can still supply 12 kWH per day because additional required energy will be transferred from energy bus 1007 into power bus 1030.

Thus, as described above, in accordance with one or more embodiments, there are two distinct advantages that result in parasitic energy loss reduction. First is that, at times of low power demand, when series-connected batteries $1020_1$-$1020_n$ are fully charged, DC chargers $1009_1$-$1009_n$ can be powered off. Second is that, during times when charging is required, chargers can be run at peak power efficiency, thereby minimizing losses incurred running at low power level efficiency.

As shown in FIG. 1, DC energy storage bus 1007 is a parallel arrangement of one or more incoming energy sources. For example, incoming solar DC energy is shown connecting to DC energy storage bus 1007 over line 1001 (also referred to as a solar input line). Incoming energy from either utility mains, or from an optional AC generator, is shown connecting to AC DC rectifier(s) 1040 on lines $1002_1$ and $1002_2$, respectively, and output therefrom is shown connecting to DC energy storage bus 1007 over line 1003 (also referred to as a rectifier input line).

As further shown in FIG. 1, lines $1005_1$ and $1005_2$ connect a parallel-connected array of batteries $1004_1$-$1004_n$ to bidirectional DC DC converter 1050, and output therefrom is shown connecting to DC energy storage bus 1007 over lines 1006. One or more of these parallel battery banks and bidirectional DC DC converters can be added to increase storage capacity. In accordance with one or more embodiments, bidirectional DC DC converter 1050 draws energy from DC energy storage bus 1007 when there is need to charge energy storage batteries $1004_1$-$1004_n$. In accordance with one or more embodiments, bidirectional DC DC converter 1050 is controlled by system supervisor 5009 to hold the voltage of DC energy storage bus 1007 at a predetermined target level, for example and without limitation, 380V DC. (Although any bus voltage can be chosen for storage bus 1007, 380V DC is becoming an industry standard and therefore more equipment is available to work with this emerging standard voltage.)

Any time the voltage of DC energy storage bus 1007 increases above 380V DC, as measured internally by DC DC converter 1050, bidirectional DC DC converter 1050 does the following. Since the power of a switch mode converter is proportional to the duty cycle of its power switching devices, when bidirectional, DC DC converter 1050 is in a discharge battery mode (i.e., it is transferring energy to DC energy storage bus 1007 from batteries $1004_1$-$1004_n$), bidirectional DC DC converter 1050 will reduce the duty cycle of its switch mode converter, and thusly, the discharge power for example, by a predetermined amount, and to zero power if needed, to reduce the voltage of DC energy storage bus 1007. However, after attempting to reduce the voltage of DC energy storage bus 1007 by reducing the switch mode duty cycle until bidirectional DC DC converter 1050 is at a state of zero discharge power, if the voltage on DC energy storage bus 1007 is still above 380V DC, then bidirectional DC converter 1050 switches into a charge battery mode (i.e., it is transferring energy from DC energy storage bus 1007 to batteries $1004_1$-$1004_n$), and begins increasing the switch mode duty cycle, thereby increasing the charge power until the voltage on DC energy storage bus 1007 is brought down to 380V DC. Note that, since DC DC converter 1050 and DC DC chargers $1009_1$-$1009_n$ are each connected to energy storage bus 1007, DC DC converter 1050 interacts with DC DC chargers $1009_1$-$1009_n$ and vice versa. In particular, any power setting change in DC DC converter 1050 will result in a voltage change on DC DC energy storage bus 1007, which voltage change will require a PWM duty cycle adjustment by DC DC chargers $1009_1$-$1009_n$ in order for the chargers to maintain their battery charge power settings. Also, PWM duty cycle adjustments by DC DC chargers $1009_1$-$1009_n$ will result in a voltage change on energy storage bus 1007, which voltage change will require DC DC converter 1050 to make a PWM duty cycle adjustment to compensate. Thus, reducing the duty cycle of DC DC converter 1050 smoothy, followed by switching energy flow directions, and then increasing the duty cycle smoothly, rather than abruptly switching energy flow directions at some non-zero power, is preferable as a smooth linear transition will allow DC DC chargers $1009_1$-$1009_n$ to adjust their PWM duty cycle to follow the voltage changes. This will reduce the possibility of instability caused by the two systems' attempting to abruptly compensate for each other's actions. Whenever the voltage on DC energy storage bus 1007 is exactly 380V DC, plus or minus a predetermined amount, for example and without limitation, plus or minus one volt (1v)), bidirectional DC DC converter 1050 holds both its switch mode state (charge or discharge) as well as the switch mode converter duty cycle. As mentioned earlier, since the power of a switch mode converter is proportional to the duty cycle of the switches, it follows that holding a fixed duty cycle will result in holding a fixed power setting. This "hold state" will remain until the voltage of bus 1007 again changes. The control cycle repeats as necessary in order to keep the voltage of bus 1007 within the desired target range. It is preferred that the above-described method to control the voltage on DC energy storage bus 1007 be embodied by having the voltage control algorithm imbedded within DC DC converter 1050, for example, using any one of a number of microcontrollers that are well known to those of ordinary skill in the art. In accordance with one or more such embodiments, system supervisor 5009 would only send "supervisory" commands such as setting a new bus voltage, should that be desired. Another example of a supervisory command would be to issue start or stop commands to DC DC converter 1050 for system start or shutdown.

When there is insufficient solar energy, as reported to system supervisor 5009 by solar controller 1089 over communication line 5011, or at times when the cost of grid power is above some predetermined level (for example, at times or prices programmed into system supervisor 5009), system supervisor 5009 will command AC DC rectifier(s) 1040 to shut down. Without power flowing from AC DC rectifiers(s) 1040, or from a solar panel array (due to insufficient solar power), additional power must come from bidirectional DC DC converter 1050 by means of exporting energy from energy storage batteries $1004_1$-$1004_n$ to DC energy storage bus 1007, and then through lines $1008_1$-$1008_n$ for absorption by DC chargers $1009_1$-$1009_n$. Again, in order to maintain energy storage bus 1007 at a constant voltage, the power into energy storage bus 1007 must match the power outflow. Thus, exporting the required extra power from energy storage batteries $1004_1$-$1004_n$ happens when a control method within DC DC converter 1050 (such as was described above) causes power to be exported from energy storage batteries $1004_1$-$1004_n$ to keep energy storage bus 1007 at the target of voltage of, for example and without limitation, 380V DC. As mentioned above, the control method would entail DC DC converter 1050 internally measuring and adjusting the voltage of energy storage bus 1007. Although the control method could operate under the control of system supervisor 5009, as further mentioned above, having the control method executed under the control of a microcontroller in DC DC converter 1050 simplifies the system by removing a requirement that voltage measurements and control commands flow back and forth between DC DC converter 1050 and supervisor 5009 via communication line 5004.

Using the same example of a desired voltage of 380V DC on DC energy storage bus 1007, whenever DC DC chargers $1009_1$-$1009_n$ either increase or decrease charging, voltage on DC energy storage bus 1007 will either decrease or increase, respectively. The voltage on DC energy storage bus 1007 will change because the power being drawn off DC energy storage bus 1007 will not match the power into DC energy storage bus 1007. Then, in order to balance the power into and out of DC energy storage bus 1007, in accordance with one or more embodiments, bidirectional DC DC converter 1050 will respond as needed to keep the voltage on DC energy storage bus 1007 at 380V DC. For example, if DC DC converter 1050 measures the voltage on DC energy storage bus 1007 decreasing to 375V DC, bidirectional DC DC converter 1050 does the following. If bidirectional DC DC converter 1050 is charging batteries $1004_1$-$1004_n$, then bidirectional DC DC converter 1050 switches to the discharge mode to export enough battery power to bring DC energy storage bus 1007 back to 380V DC. If, however, bidirectional DC DC converter 1050 is in the discharge mode, bidirectional DC DC converter 1050 only needs to increase power until DC energy storage bus 1007 again reaches the desired 380V DC.

Since DC power bus 1030 supplies the high power peaks to DC AC inverter 1080, energy storage bus 1007 only needs one or more low power bidirectional DC DC converters 1050 to run occasionally to top off the energy of the high voltage, series-connected, battery array (batteries $1020_1$-$1020_n$) over a 24 hour period. In accordance with one or more embodiments for an average house, a single one-kW (1 kW), bidirectional DC DC converter 1050 can supply series-connected batteries $1020_1$-$1020_n$ with the required 12 kWH in a 12 hour period. During the other 12 hours, bidirectional DC DC converter 1050 runs in reverse to store 12 kWH into parallel-connected batteries $1004_1$-$1004_n$. Since bidirectional DC DC converter 1050 is sized so that it will always be running at the peak efficiency point of 98% efficiency (of our typical exemplar converter), then bidirectional DC DC converter 1050 has, in our example, 1 kW*0.02 or 20 W of loss. This is 480 kWH of loss in a 24 hour period, or 4% of the loss of the conventional single bus low voltage system.

The following provides a method to accomplish this storage example. The available energy from incoming sources over lines 1001 and 1003, must match the outgoing home energy requirement, i.e., 12 kWH per day in this example. If, for example, the majority of the energy is desired to be provided by solar panels, then the solar array must be sized to supply 12 kWH in each 24 hour period. Methods for sizing solar systems are well documented on the National Renewable Energy Laboratory (NREL website at: https://pvwatts.nrel.gov/). A reason for matching the solar in this manner is that too little solar power will require more grid power to be purchased. A design with solar power far in excess of the home load will increase the cost of the system without adding any benefit. For our example of a 12 kWH daily need, a solar installation that nets 12 kWH per solar day in the winter months (when solar power is at a minimum) would be adequate and economical.

Likewise, batteries $1004_1$-$1004_n$ must be sized to store at least that same 12 kWH in 24 hours. Again, the energy into the system from the sun, and the energy outflow of storage bus 1007 must balance. A first order, simple control system would be as described above. In such a system. bidirectional DC DC converter 1050 need only keep DC energy storage bus 1007 at 380V DC by alternately charging and discharging batteries $1004_1$-$1004_n$. As long as DC energy storage bus 1007 remains at 380V DC over the 24 hour period, then the energy into the system and the energy out of the system will be equal.

In accordance with one or more embodiments, the multi-bus system allows modular design of DC energy storage bus 1007 which can be tailored to meet the daily energy needs of different households. In our example, energy storage block 1060 (comprised of bidirectional DC DC converter 1050 and parallel-connected battery array $1004_1$-$1004_n$) would be tailored to a standard 12 kWH home. For a more demanding home, say a home using 20 kWH, another energy storage block like energy storage block 1060 could be added. In similar fashion, a fewer or greater number of batteries $1004_1$-$1004_n$ can make up each energy storage block 1060. DC power demand bus ($1030_1$, $1030_2$) can be standardized, since it gets its daily energy needs from a modularized DC energy storage bus 1007. Since normal-sized, single-family homes have a standard electrical service panel rated at 24 KW, DC power demand bus ($1030_1$, $1030_2$) and DC AC inverter 1080 will also be standard for nearly all homes. However, for larger homes with the next standard electrical panel of 48 kW, then a 48 kW rated DC AC inverter 1080 would be connected to the same DC power demand bus ($1030_1$, $1030_2$). Further, if more than one DC AC inverter is required because, for example, there is a second home or there is a second AC panel in a home, then DC power demand bus ($1030_1$, $1030_2$) and its associated components can be duplicated and yet still be connected to a single DC energy storage bus 1007. In each case, DC power demand bus ($1030_1$, $1030_2$) and its associated components would be identical in construction, with each having a tie to DC energy storage bus 1007.

Bidirectional DC DC converter 1050 for the example of a 48V DC to 380V DC system may be an Epic Corp. model 2k2 384i, or an eIQ energy bidirectional converter. An example DC DC charger 1009 may be an Epic Corp. 2k2 384i or an eIQ energy model IsoCharger. An example AC DC rectifier 1040 may be an Eltek Corp. model flatpack2

380V/3000W HE. An example DC AC inverter may be an Oztek OZPCS-RS40. Example batteries may be Vanguard Power 48V batteries, with models from 1.5 kWH to 10 kWH.

One issue is that continual charging/discharging of batteries has a cost associated per cycle. For example, a $1000 battery that can cycle 1000 times has a $1 cost per cycle. One or more embodiments are advantageously useful to reduce that cycle cost. At times when AC grid, TOU power is less expensive than the battery cycle cost, or when there is adequate solar energy, bidirectional DC converter(s) 1050 can be powered down via a command from system supervisor 5009, both to reduce parasitic energy losses as well as to avoid cycle costs of batteries 1004$_1$-1004$_n$. The simplest means to implement a reduced charge cycle method is to know the cost per battery cycle and compare it to the rate-payer's TOU cost plan (provided by the utility company). If there is a TOU period that is less expensive than a battery cycle, then that TOU time period can be used. A method can then be as simple as, during the selected TOU period, system supervisor 5009 will activate AC DC rectifier 1040 that is connected to the rate-payer's utility grid. AC DC rectifier 1040 DC output is pre-set, in the example above, to 380V DC. In this manner, AC DC rectifier 1040 will hold DC energy storage bus 1007 at 380V. As long as DC energy storage bus 1007 is at 380V DC, and bidirectional DC DC converter 1050 is also set to maintain 380V DC on DC energy storage bus 1007, then bidirectional DC DC converter 1050 will not need to transfer energy in either direction. System supervisor 5009 will command bidirectional DC DC converter 1050 into the off state, thereby eliminating parasitic energy loss by converter 1050. While bidirectional DC DC converter 1050 is in the off state, no charge or discharge cycles will happen to batteries 1004$_1$-1004$_n$. System supervisor 5009 will also issue a command directing DC chargers 1009$_1$-1009$_n$ to hold the state-of-charge of batteries 1020$_1$-1020$_n$ at a constant state-of-charge. It follows that if the state-of-charge of batteries 1020$_1$-1020$_n$ is constant, then they are neither undergoing charge nor discharge cycles. The energy supplied out to the home then is exactly balanced with the lower cost energy imported from the utility grid through AC DC rectifier 1040. At times when battery cycle costs are less than grid power, then allowing the battery state-of-charge to change in response to the home's energy needs is more economical. An example of a desirable state-of-charge change method would be to charge all batteries fully using solar power during daytime, and discharging batteries during hours when TOU cost is higher than battery cycle costs.

Although the embodiment described above with reference to FIGS. 1 and 5, shows power demand bus (1030$_1$, 1030$_2$) connected to DC AC inverter 1080, it should be understood that further embodiments exist where power demand bus (1030$_1$, 1030$_2$) is connected to a load, for example and without limitation, a DC load such as, for example and without limitation, DC appliances and DC electric vehicle chargers.

Embodiments described above are exemplary. As such, many changes and modifications may be made to the description set forth above by those of ordinary skill in the art while remaining within the scope of the invention. In addition, materials, methods, and mechanisms suitable for fabricating embodiments have been described above by providing specific, non-limiting examples and/or by relying on the knowledge of one of ordinary skill in the art. Materials, methods, and mechanisms suitable for fabricating various embodiments or portions of various embodiments described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A multi-bus, energy storage system comprised of:
    an energy storage bus;
    a bidirectional DC DC converter that is connected to the energy storage bus and to a parallel-connected array of energy storage batteries; which bidirectional DC DC converter is adapted to: (a) draw energy from the energy storage bus to charge the energy storage batteries and (b) draw energy from the energy storage batteries and transfer it to the energy storage bus;
    wherein the energy storage bus is adapted to be connected to outputs from one or more energy sources which are connected in parallel to each other and the bidirectional DC DC converter on the energy storage bus, which outputs comprise an output from one or more of a solar panel array, an AC DC rectifier that receives input from a utility main and/or an AC generator; and the energy storage bus is adapted to receive: (a) solar energy output from the solar panel array over a solar input line; and (b) energy output from the AC DC rectifier over an input line;
    a power demand bus that provides power delivery, which power bus is comprised of a series-connected array of batteries and is adapted to be connected to and provide power delivery to a load;
    wherein each battery in the series-connected array of batteries is connected to a DC DC charger, which DC DC chargers are connected to the energy storge bus and are adapted to draw energy from the energy storage bus and to charge the battery to which it is connected; and
    a supervisory system comprised of a system supervisor;
    wherein the system supervisor is adapted to (a) receive information from an AC DC rectifier and send supervisory level commands thereto over an AC DC rectifier control line; (b) receive information from the bidirectional DC DC converter and send supervisory level commands to the converter over a converter control line; (c) receive charger information from the DC DC chargers and send supervisory level commands to the DC DC chargers over charger control lines; and (d) receive information from a solar controller and send supervisory level commands to the solar controller over a solar control line.

2. The multi-bus, energy storage system of claim 1 wherein:
    the DC DC chargers do not drain energy from batteries in the serial-connected array of batteries to keep all the batteries at the same state of charge; and
    the system supervisor is adapted to cause: (a) DC DC chargers that are not needed to operate for charging to be completely powered off; and (b) DC DC chargers that are charging to run at or near their optimal power efficiency setting.

3. The multi-bus, energy storage system of claim 1 wherein:
    the DC DC chargers do not drain energy from batteries in the serial-connected array of batteries to keep all the batteries at the same state of charge; and the system supervisor is adapted to cause the DC DC chargers: (a) to be powered off at times of low power demand, when the series-connected batteries are fully charged and (b) to run at or near their optimal power efficiency setting at times when charging is required.

4. The multi-bus, energy storage system of claim 1 wherein:
the system supervisor is adapted to cause a DC DC charger to charge: (a) a low state-of-charge battery at a high enough rate of current so that the DC DC charger is operating at or near its optimal operating point; and (b) a high state-of-charge battery at a low enough rate of current so that the DC DC charger is operating at a predetermined non-optimal operating point or not being operated at all.

5. The multi-bus, energy storage system of claim 4 wherein:
batteries in the series-connected array of batteries have battery charge management system ("BMS") data links into their internal battery management systems; and
the BMS data links are connected to, and send BMS data to, the system supervisor.

6. The multi-bus, energy storage system of claim 5 wherein:
the system supervisor is adapted to: (a) monitor the BMS data to monitor one or more of a state of charge, a state of health, and temperature of the batteries; and (b) provide a warning notice for a battery with a poor reported state of health.

7. The multi-bus, energy storage system of claim 1 wherein the bidirectional DC DC converter comprises a microcontroller which is adapted to cause the bidirectional DC DC converter to hold a voltage of the energy storage bus at a predetermined target value.

8. The multi-bus, energy storage system of claim 1 wherein the bidirectional DC DC converter comprises a microcontroller which is adapted to:
determine whether the voltage of the energy storage bus has increased above a predetermined target value, and if so, causes the bidirectional DC DC converter to do the following:
when the bidirectional DC DC converter is in a discharge battery mode, the bidirectional DC DC converter reduces a discharge power by a predetermined amount, and to zero power if needed, to reduce the voltage of the energy storage bus;
if the voltage on the energy storage bus is still above the predetermined target value, then the bidirectional DC DC converter is switched into a charge battery mode, and begins increasing a charge power until the voltage on the energy storage bus is brought down to the predetermined target value; and
whenever the voltage on the energy storage bus is substantially equal to the predetermined target value, the bidirectional DC DC converter is caused to hold its switch mode state and its power setting until the voltage of the energy storage bus again changes.

9. The multi-bus, energy storage system of claim 1 wherein:
the system supervisor is adapted: (a) to determine whether there is insufficient solar energy, or the cost of grid power is above a predetermined level at times or prices available to the system supervisor, and if so; (b) to command an AC DC rectifier to shut down; and (c) to cause a microcontroller in the bidirectional DC DC converter to cause the bidirectional DC DC converter to export extra power from the energy storage batteries to keep the voltage of the energy storage bus at a predetermined target value.

10. The multi-bus, energy storage system of claim 1 wherein:
the system supervisor is adapted to select a time-of-use period for a utility that is low cost, and in response, the system supervisor is adapted to:
activate an AC DC rectifier that is connected to a utility grid and to the energy storage bus, which AC DC rectifier output is set to a predetermined voltage target value, whereby the AC DC rectifier will hold the energy storage bus at the predetermined voltage target value.

11. The multi-bus, energy storage system of claim 10 wherein:
when the energy storage bus is at the predetermined voltage target value the bidirectional DC DC converter will be in an idle state and will not transfer energy to or from the energy storage bus and the bidirectional DC DC converter; and
when the bidirectional DC DC converter is in the idle state, no charge or discharge cycles will occur for the series-connected array of batteries.

12. The multi-bus, energy storage system of claim 10 wherein:
the system supervisor is adapted to select a time period when AC grid, time-of-use power is less expensive than a battery cycle cost, or when there is adequate solar energy, and in response, the system supervisor is adapted to send a command to the bidirectional DC DC converter to power down.

13. The multi-bus, energy storage system of claim 1 wherein:
whenever the DC DC chargers either increase or decrease charging, voltage on the energy storage bus either decreases or increases, respectively, and
to balance power into and out of the energy storage bus the bidirectional DC DC converter is adapted to respond to keep the voltage on the energy storage bus at a predetermined target value.

14. The multi-bus, energy storage system of claim 1 wherein the bidirectional DC DC converter comprises a microcontroller which is adapted to:
determine whether a voltage of the energy storage bus has decreased below a predetermined voltage target value, and if so, causes the bidirectional DC DC converter to do the following:
if the bidirectional DC DC converter is charging the energy storage batteries, then the bidirectional DC DC converter switches to a discharge mode and exports enough battery power to bring the energy storage bus back to the predetermined voltage target value; and
if the bidirectional DC DC converter is in the discharge mode, the bidirectional DC DC converter increases power until the energy storage bus reaches the predetermined voltage target value.

15. The multi-bus, energy storage system of claim 1 wherein:
the charger information includes state-of-charge data received by the system supervisor over the charger control lines from battery charge management systems built into the batteries in the series-connected array of batteries; and
the system supervisor issues the supervisory level commands to the DC DC chargers over the charger control lines specifying how much charge power to send to the batteries in the series-connected array of batteries.

16. The multi-bus, energy storage system of claim 1 wherein the load is a DC load.

17. The multi-bus, energy storage system of claim 16 wherein the DC load is a DC appliance or a DC electric vehicle charger.

* * * * *